May 4, 1937.  A. D. EITZEN  2,078,937

OPTICAL SYSTEM METHOD AND APPARATUS

Original Filed Nov. 18, 1933  2 Sheets—Sheet 1

INVENTOR
August D. Eitzen,
BY Gustav Drews
ATTORNEY

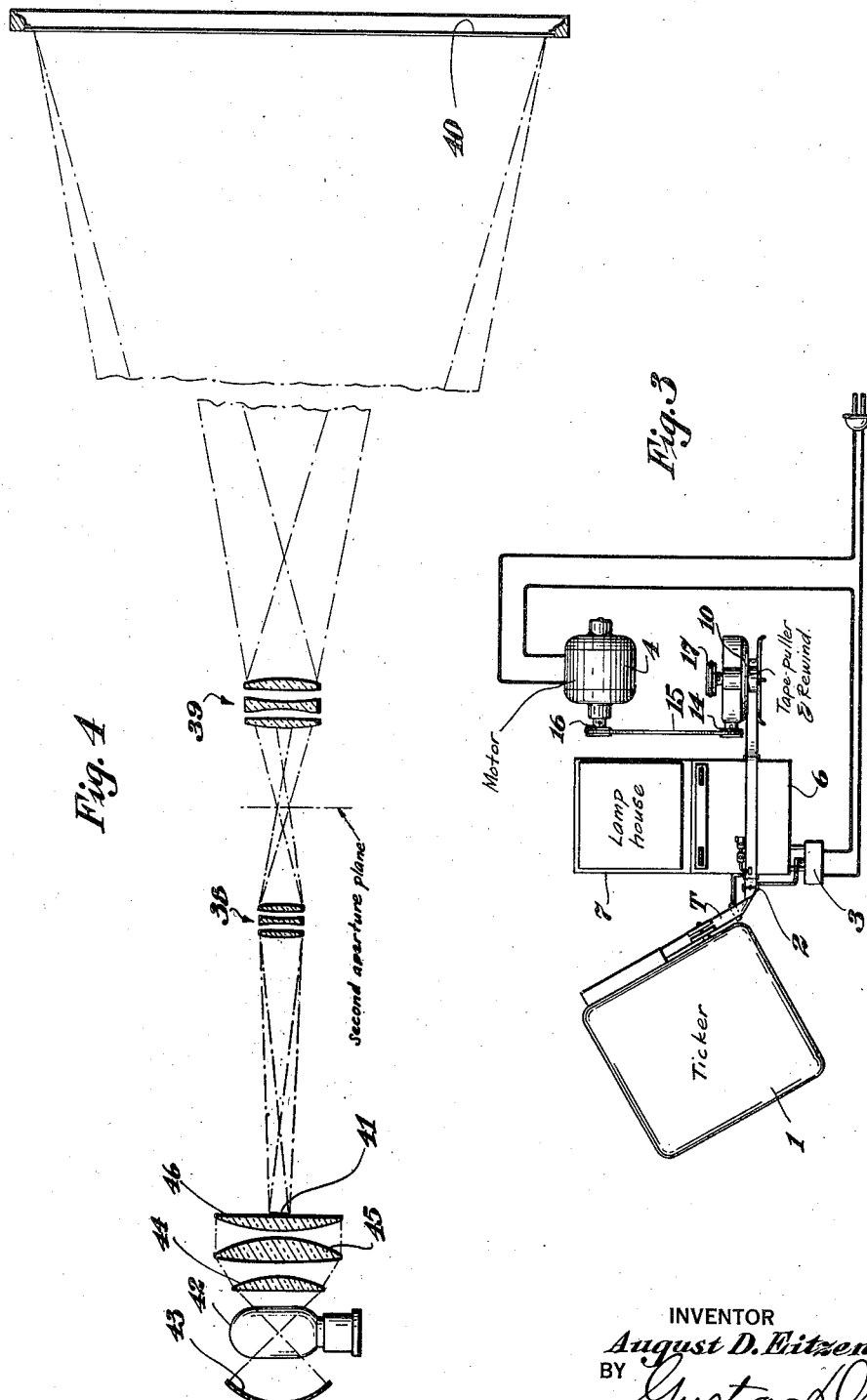

UNITED STATES PATENT OFFICE 2,078,937

OPTICAL SYSTEM METHOD AND APPARATUS

August D. Eitzen, Rockville Centre, N. Y., assignor to News Projection Corporation, New York, N. Y., a corporation of New York Application November 18, 1933, Serial No. 698,564
Renewed August 1, 1936

4 Claims. (Cl. 88—24)

This invention relates to optical system method and apparatus in general and more especially to optical systems for producing a plurality of images of a marked tape or the like passing across a single light aperture.

Among the objects of the present invention, it is aimed to provide an improved optical system for producing a plurality of images of the markings on a tape, film or the like passing across a single light aperture with a single source of light.

It is another object of the present invention to provide an improved optical system in which the light beam from a single source of light is divided and the subordinate beam portions then projected through a tape or the like at a single light aperture into different directions to produce a plurality of images of the same markings on the tape and then guiding the images so formed to a plurality of screens.

It is still another object of the present invention to provide an improved optical system especially adapted for use with a stock quotation projection machine in which the light beam from a single source of light is divided and the divided portions projected through the ticker tape disposed at a single light aperture as it is discharged by a ticker to produce a plurality of images of the same markings on the tape and thereupon directing the images to a plurality of screens in different inspection areas.

It is still a further object of the present invention to provide an improved optical system in which the light beam from a single source of light is divided into subordinate light beams which are projected through a marked tape disposed at a single light aperture to produce two sets of images of the same markings on the tape and means including objective lens units for directing the images so produced onto two screens facing in opposite directions in upright legible position.

It is still another object of the present invention to provide an improved optical system in which the light beam may be directed upwardly through a transparent or translucent tape having printed matter thereon facing downwardly and in which the image of such printed matter is projected onto the rear face of a translucent vertical screen by means including two objective lens units and a single mirror whereby moving images of the printed matter on the tape in upright readable manner will appear on the front face of the screen moving in the same direction on the screen as the tape moves across the light aperture.

These and other features, capabilities and advantages of the invention will appear from the subjoined detail description of specific embodiments thereof illustrated in the accompanying drawings in which Figure 1 is an end elevation partly in section of a stock quotation projecting machine equipped according to one embodiment of the present invention;

Fig. 3 is a plan view of the embodiment illustrated in Fig. 1 on a reduced scale; and Fig. 4 is a diagrammatic view showing two sets of lens units used in another embodiment of the present invention.

Figure 1:
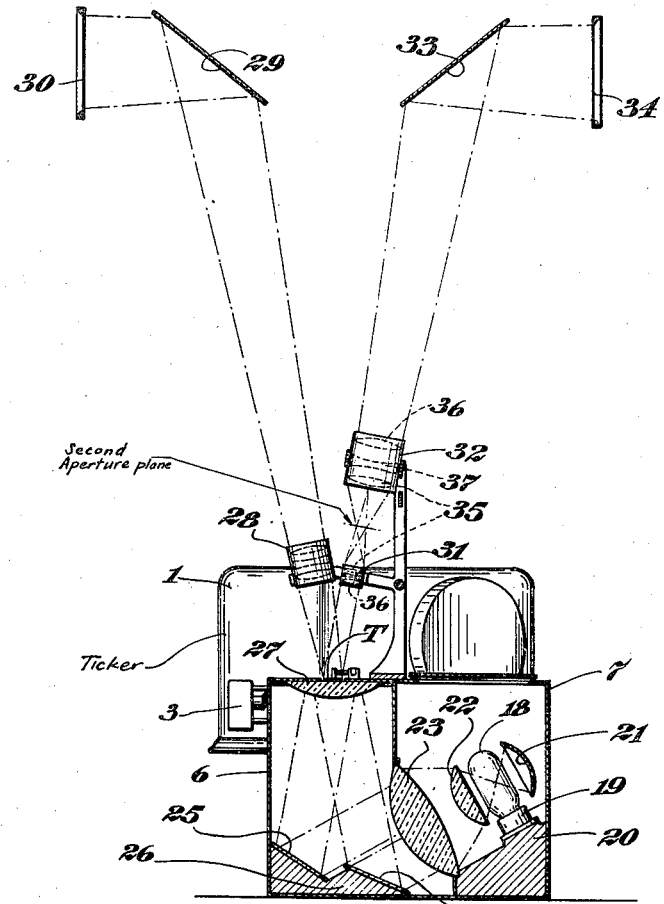
Figure 2:
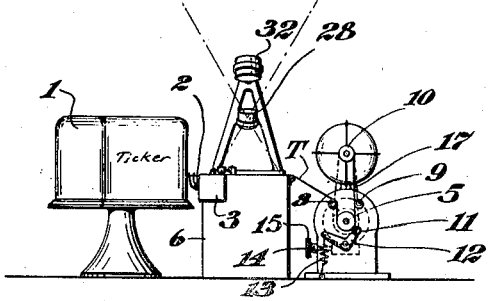
Fig. 2 is a front elevation of the embodiment illustrated in Fig. 1 on a reduced scale.

In the embodiment shown in Figs. 1 to 3, there is illustrated a ticker 1 from which marked tape T is intermittently discharged, passing initially under the control finger 2 associated with a switch in the housing 3 connected by suitable electric conductors with the motor 4 for driving the tape puller 5, the tape passing from the control finger across the light aperture formed at the upper end of the extension 6 of the lamp housing 7 and then to and across the idler 8 to the tape pulling roller 5 and from there into engagement with the idler 9 up to the rewind reel 10.

The tape T is maintained in engagement with the tape pulling roller 5 by the pressure roller 11 mounted on the arm 12 which is connected to the spring 13 for urging the idler 11 to press the tape into driving engagement with the roller 5. The tape pulling roller 5 is drivingly connected to the sheave 14 which in turn is connected by the belt 15 with the sheave mounted on the shaft 16 of the motor 4.

The shaft of the pulling roller 5 in turn is provided with a sheave which is connected by the spring belt 17 with the sheave fixed to the rewind reel 10.

In the present instance, we are primarily concerned with the optical system now to be described. In the lamp housing 7, as an instance, there is mounted a lamp 18 in a socket 19 formed on a support 20 and positioned at an acute angle to the vertical shown in the present instance as an angle of approximately thirty degrees to the vertical. The lamp is provided with the usual reflector 21 for directing the main beam of light downwardly at an angle to the vertical in the present instance as approximately an angle of sixty degrees to the vertical.

For initially converging the light there is provided the condensing lens 22 to direct the light onto the condensing lens 23 from which the light beam in the present instance is directed onto two reflectors, to wit the mirrors 24 and 25 each intercepting approximately one-half of the main light beam projected by the condensing lens 23.

These mirrors 24 and 25 are positioned on the support 26 at different angles to the vertical and at the bottom of the extension housing 6 to deflect the subordinate light beams produced and intercepted upwardly onto the condenser 27 positioned at the top of the extension 6 and adjacent to the light aperture across which the tape T is advanced.

The subordinate light beam deflected by the mirror 24 passes up through the tape T and after being impressed with an image passes up through the objective lens unit formed in the casing 28 and then passes up to the deflector 29 to be deflected onto the screen 30 disposed in one inspection area.

The subordinate light beam intercepted by the mirror 25 passes up through the tape T and after being impressed with an image of the markings on the tape will initially pass through the objective lens unit mounted in the casing 31 and then pass up to a secondary aperture plane and thence to the rotation objective lens unit mounted in the casing 32 and from there pass onto the deflector 33 to be deflected onto the screen 34 facing in a direction opposite to that of the screen 30 in a second inspection area.

The rotation objective lens unit mounted in the casing 32 will rotate the image received from the objective lens unit mounted in the casing 31 so that a single mirror 33 will be sufficient to guide the image ultimately onto the screen 34.

The objective lens units mounted in the casings 31 and 32 are substantially identical with one another, each having two outer convexo-convex lenses 35 and 36, preferably composed of crown glass and an intermediate concavo-concave lens 37 preferably composed of flint glass.

From the foregoing, it will thus appear that with a single source of light, to wit the lamp 18 and a single tape T positioned at a single light aperture adjacent to the lens 27, two images of the same tape marking will be simultaneously projected by the subordinate light beams, intercepted by the mirrors 24 and 25 and ultimately appear on the screens 30 and 34 in different inspection areas with the screens facing in opposite directions.

It will also appear from the foregoing that only a single mirror will be required adjacent to each screen. This is brought about when the ticker tape T, a master, is advanced across the light aperture with its printed face facing downwardly, when the objective lens unit in the housing 28 will receive the back view of the image and rotate it one hundred and eighty degrees and the mirror 29 will in turn invert it to face forwardly and direct it onto the rear face of the screen 30 to appear in its upright readable position on the front face of the screen 30. The objective lens unit in the housing 31 on the other hand similarly will receive the back view of the image and rotate it one hundred and eighty degrees and the objective lens unit in the housing 32 will again rotate it one hundred and eighty degrees whereupon the mirror 33 facing in the opposite direction to that of the mirror 29 will invert the image thereupon received to face forwardly and direct it onto the rear face of the screen 34 to appear in its upright readable position on the front face of the screen 34.

From the foregoing, it will also appear that by means of two objective lens units, see the lens units mounted in the housings 31 and 32, the images on the downward face of a tape may be directed upwardly onto the rear face of a vertical screen to appear in upright legible manner on the front face of a vertical screen, to wit the screen 34 moving in the same direction as the direction of the tape T.

In the embodiment illustrated in Fig. 4, there is shown an optical system including two objective lens units, to wit the lens units 38 and 39 by means of which the images on a printed tape facing away from the source of light may be projected on the rear face of a vertical screen to appear in upright legible manner on the front face of the screen 40 moving in the same direction as the tape 41.

In this embodiment, there is also provided a single source of light, to wit the lamp 42, the light beam of which is directed by the reflector 43 on the condenser 44 and then through the condensers 45 and 46 through the tape 41. The image impressed beam then diverges and passes through the objective lens unit 38 and then is directed to pass through the lens unit 39 and ultimately projected on the rear face of the screen 40. The lens units 38 and 39 have their lens elements reversed relative to one another, the lens unit 38 having its short focal length extending from the lens unit 38 toward the screen 40 or a reduced aperture plane in space and the lens unit 39 having its short focal length extending from the lens unit 39 toward the tape 41, or toward said reduced aperture plane in space.

It is obvious that various changes and modifications may be made to the details of construction without departing from the general spirit of the invention as set forth in the appended claims.

I claim:

1. The combination with two vertically extending screens facing in opposite directions, of a single horizontally extending light aperture, means for advancing a printed tape across said light aperture, means for directing two diverging light beams through the tape disposed at said light aperture to produce two diverging image impressed light beams, means including a single objective lens unit and a single deflector for directing one of said image impressed light beams onto one of said screens in upright readable position, and means including two objective lens units and a single deflector for directing the other diverging image impressed light beam onto the other of said screens in upright readable position, said tape advancing means being positioned to move said tape in the same direction as the message on one screen and in the opposite direction to the direction of the message on the other screen.

2. The combination with a light aperture disposed in a horizontal plane, of means for advancing across said light aperture a light transmitting ticker tape having the printed matter thereof reading longitudinally of said tape and facing downwardly thereof, a vertically extending translucent screen, means for directing a beam of parallel light rays through the ticker tape at said light aperture in an upward direction to produce an image impressed light beam, and means including two objective lens units and a single deflector disposed above said ticker tape to direct the image impressed light beam onto the rear face of said screen to appear in an upright readable position moving in the same direction across said screen as the direction of the tape moving across said light aperture.

3. The combination of two translucent rear projection screens facing in opposite directions, a single horizontally extending light aperture, a light transmitting tape having a message impressed thereon in light obstructing characters reading longitudinally of said tape with the marked side facing downwardly, means for advancing said tape in a direction parallel to said screens, means for directing two diverging light beams through the tape disposed at said light aperture to produce two diverging image impressed light beams, means including a single objective lens unit and a single deflector for directing one of said diverging image impressed light beams onto the rear face of one of said screens to appear in upright readable position on the front face of said screen, and means including two objective lens units and a single deflector for directing the other diverging image impressed light beam onto the rear face of the other of said screens to appear in upright readable position on the front face of said latter screen, said tape advancing means advancing said tape with the portions of the message in the succession in which they are read and in the same direction as the message on one screen and in the opposite direction to the direction of the message on the other screen.

4. The combination of a light aperture disposed in a horizontal plane, a light transmitting tape having a message impressed thereon in light obstructing characters, means for advancing said tape with the marked side facing downwardly and advancing the portions of the message in the succession in which read, a translucent or rear projection screen extending parallel to the path of movement of the tape, means for directing a beam of light rays through the tape at said light aperture in an upward direction to produce an image impressed light beam, and means including two objective lens units and a single deflector disposed above said tape to direct the image impressed light beam onto the rear face of said screen to appear in an upright readable position on the front face of said screen and moving in the same direction across said screen as the direction of the tape moving across said light aperture.

AUGUST D. EITZEN.